UNITED STATES PATENT OFFICE.

CAMPBELL C. CARPENTER, OF BUFFALO, NEW YORK, ASSIGNOR, BY MESNE ASSIGNMENTS, TO GUARANTY TRUST COMPANY OF NEW YORK, TRUSTEE, A CORPORATION OF NEW YORK.

TREATMENT OF STORAGE-BATTERY PLATES.

1,164,464.     Specification of Letters Patent.     Patented Dec. 14, 1915.

No Drawing.     Application filed March 8, 1910. Serial No. 548,027.

*To all whom it may concern:*

Be it known that I, CAMPBELL C. CARPENTER, a citizen of the United States, residing at Buffalo, in the county of Erie and State of New York, have invented new and useful Improvements in the Treatment of Storage-Battery Plates, of which the following is a full, clear, concise, and exact description.

This invention relates to an improved process of treating formed battery plates in order to deposit inert material within what is known as the "active material" and the process applies both to Planté and pasted plates.

The advantages of incorporating with the active material of the plate, a porous inert substance for the purpose of keeping open the pores of the plate during continued service, is well understood. Among the many advantages are the following: The spongy portions are prevented from consolidating into a mass more dense than is favorable to the free circulation of the electrolyte. This tendency to condense is seen particularly as the plates become old and any arrangement for retaining the original characteristics of the plates, also helps maintain the life and efficiency of the battery. Also the plates are further mechanically improved, as they are better able to withstand the disintegrating tendencies due to repeated contraction and expansion, particularly in pasted plates. In the methods previously adopted to secure the above advantages, two steps are usually employed in the process. First, the plate is immersed in a solution of soluble salt or a soluble body and the saturated plate is then subjected to the action either of an acid bath or heat, in order to separate an insoluble substance. For example, one method is to immerse the formed plate in a solution of barium nitrate and then in a solution of sulfuric acid. The nitrate reacts with the acid to form insoluble barium sulfate, which remains incorporated in the material of the plate, and nitric acid, which is washed off. Another method is to soak the formed plate in a solution of sugar, whereby finely divided organic material is deposited in the plate, which is afterward baked to carbonize the sugar. The carbonized material, being unaffected by the electrolyte, has the effect of increasing the useful life of the plate. These processes are known as permanizing processes, in that they tend to increase the useful life of the plate, and hence tend to render the same more permanent.

The present invention aims to secure the advantages of the prior processes by using a single step instead of two, thereby improving and cheapening the method.

The persulfates of the alkaline earths have the power of oxidizing certain metals, particularly sponge lead, and by the reaction, the persulfate salt is decomposed, forming lead oxid and normal sulfate. This reaction applies particularly to the persulfates of barium and calcium, the normal sulfates of which are practically insoluble and therefore well adapted when diffused throughout the active mass of a battery plate, to lengthen the useful life thereof by acting as a so-called permanizer.

In carrying out my process I immerse the formed battery plate in a solution of a single persulfate salt, and thereby obtain the reaction explained above. The insoluble normal sulfate is uniformly diffused throughout the active mass, and preserves the porous spongy characteristics necessary for the free diffusion of the electrolyte. During the drying of the electrode, before treatment with the persulfate, more or less of the sponge lead is converted to the lead oxid PbO. The reaction of the persulfate on the sponge lead is probably as indicated in the following formula:

$$BaS_2O_8.4H_2O + Pb = PbO + BaSO_4 + H_2SO_4 + 3H_2O$$

thus oxidizing the lead to a normal oxid, PbO. This in turn is oxidized by an excess of the alkaline persulfate to lead peroxid, the reaction for which is probably represented by the following formula:

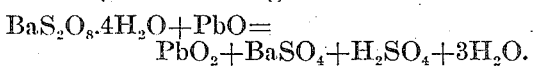
$$BaS_2O_8.4H_2O + PbO = PbO_2 + BaSO_4 + H_2SO_4 + 3H_2O.$$

As stated above, the persulfates of the alkaline earths are particularly well adapted for the foregoing reaction, but I do not limit myself to them but intend to include any substance or compound, capable of acting on the plates to deposit therein an inert substance in a single step, and coming within the scope of the appended claims.

Having thus described my invention, what

I claim as new and desire to secure by Letters Patent of the United States is:

1. The process of treating negative battery plates which consists in immersing a formed plate in a solution of a persulfate of an alkaline earth.

2. The process of permanizing battery plates, which consists in subjecting a formed plate to the action of the persulfates of alkaline earths.

3. A process of permanizing lead battery plates which consists in subjecting a formed plate to the action of a salt solution having the properties of oxidizing the lead of the plate and at the same time splitting out an insoluble compound which remains diffused throughout the plate.

4. A process of permanizing a lead battery plate which consists in subjecting the formed plate to the action of a solution which has the property of re-acting with the lead of the plate to form an insoluble inert compound which remains diffused throughout the plate.

5. The process of permanizing a lead battery plate which consists in subjecting the formed plate to the action of a solution which has the property of reacting with the lead of the plate to form a compound unaffected by charging and discharging the battery which remains diffused throughout the plate.

In witness whereof, I have hereunto subscribed my name in the presence of two witnesses.

CAMPBELL C. CARPENTER.

Witnesses:
HENRY W. BINDERNAN,
C. D. TALLMAGE.

Copies of this patent may be obtained for five cents each, by addressing the "Commissioner of Patents, Washington, D. C."